United States Patent
Excoffier et al.

(10) Patent No.: US 7,797,412 B2
(45) Date of Patent: Sep. 14, 2010

(54) METHOD AND SYSTEM FOR MANAGING SERVER CONFIGURATION DATA

(75) Inventors: Karine Excoffier, Montbonnot (FR);
Gilles Bellaton, Saint Martin (FR);
Mark Craig, Barraux (FR); Eric LePonner, Gieres (FR)

(73) Assignee: Oracle America Inc., Redwood City, CA (US)

(*) Notice: Subject to any disclaimer, the term of this patent is extended or adjusted under 35 U.S.C. 154(b) by 788 days.

(21) Appl. No.: 11/586,752

(22) Filed: Oct. 25, 2006

(65) Prior Publication Data
US 2008/0104215 A1 May 1, 2008

(51) Int. Cl.
*G06F 15/173* (2006.01)
(52) U.S. Cl. .............. 709/223; 709/220; 709/228; 709/248; 707/2; 707/8; 707/10
(58) Field of Classification Search .......... 709/220, 709/223, 228, 248; 707/2, 8, 10
See application file for complete search history.

(56) References Cited

U.S. PATENT DOCUMENTS

| | | | | |
|---|---|---|---|---|
| 6,813,633 B2* | 11/2004 | Wong et al. | | 709/217 |
| 7,216,117 B2* | 5/2007 | Smith | | 1/1 |
| 7,469,271 B2* | 12/2008 | Shimada et al. | | 709/206 |
| 7,509,325 B2* | 3/2009 | Martin et al. | | 707/10 |
| 2002/0029227 A1* | 3/2002 | Multer et al. | | 707/203 |
| 2002/0049812 A1* | 4/2002 | Nahon | | 709/204 |
| 2002/0186619 A1* | 12/2002 | Reeves et al. | | 368/47 |
| 2002/0198883 A1* | 12/2002 | Nishizawa et al. | | 707/10 |
| 2005/0138192 A1* | 6/2005 | Encarnacion et al. | | 709/230 |
| 2005/0138193 A1* | 6/2005 | Encarnacion et al. | | 709/230 |
| 2005/0278445 A1* | 12/2005 | Quang et al. | | 709/226 |
| 2006/0112150 A1* | 5/2006 | Brown et al. | | 707/201 |
| 2006/0149707 A1* | 7/2006 | Mitchell et al. | | 707/2 |
| 2006/0224775 A1* | 10/2006 | Lee et al. | | 709/248 |
| 2008/0034068 A1* | 2/2008 | Vaughan et al. | | 709/220 |
| 2008/0098005 A1* | 4/2008 | Goradia | | 707/10 |

* cited by examiner

*Primary Examiner*—Wing F Chan
*Assistant Examiner*—Razu A Miah
(74) *Attorney, Agent, or Firm*—Osha • Liang LLP (57) ABSTRACT

A computer readable medium includes executable instructions for managing server configuration data by configuring a first server using local server configuration data, where the local server configuration data is stored on the first server and as shared server configuration data by a first directory service instance operating on the first server, synchronizing the first directory service instance with a second directory service instance operating on a second server, where the shared server configuration data is updated, and updating the local server configuration data using the updated shared server configuration data.

18 Claims, 7 Drawing Sheets

METHOD AND SYSTEM FOR MANAGING SERVER CONFIGURATION DATA

BACKGROUND

Computer networks involve two or more computer systems configured to communicate with each other, one or more of which may be servers. Specifically, servers are computer systems that are configured to offer services to other computer systems in the computer network. Typically, each server in a computer network includes one or more sets of configuration data associated with software applications installed on the server. Configuring some or all of the software applications using the configuration data is broadly referred to as configuring the server. Therefore, the configuration data associated with the software application(s) may be collectively referred to as server configuration data.

To update server configuration data, one of two strategies is typically implemented. One strategy is for an administrator to perform a manual update of server configuration data on each server that requires updating. Another strategy is to maintain a central configuration server, where other servers in the computer network communicate with the central configuration server to obtain up-to-date server configuration data.

SUMMARY

In general, in one aspect, the invention relates to a computer readable medium. The computer readable medium comprises executable instructions for managing server configuration data by configuring a first server using local server configuration data, wherein the local server configuration data is stored on the first server and as shared server configuration data by a first directory service instance operating on the first server, synchronizing the first directory service instance with a second directory service instance operating on a second server, wherein the shared server configuration data is updated, and updating the local server configuration data using the updated shared server configuration data.

In general, in one aspect, the invention relates to a computer readable medium. The computer readable medium comprises executable instructions for managing server configuration data by modifying local server configuration data stored on a first server, updating shared server configuration data using the modified local server configuration data, wherein the shared server configuration data is stored by a first directory service instance operating on the first server, and synchronizing the first directory service instance with a second directory service instance operating on a second server, wherein the shared server configuration data is updated.

In general, in one aspect, the invention relates to a system. The system comprises a first server comprising local server configuration data, and a first directory service instance configured to store shared server configuration data, wherein the shared server configuration data is updated when the local server configuration data is modified. The system further comprises a second server comprising a second directory service instance configured to store the shared configuration data, wherein the first directory service instance and the second directory service instance are further configured to synchronize the shared configuration data.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for managing server configuration data. Specifically, local server configuration data is stored as shared server configuration data and synchronized between directory service instances operating on two or more servers.

Figure 1:
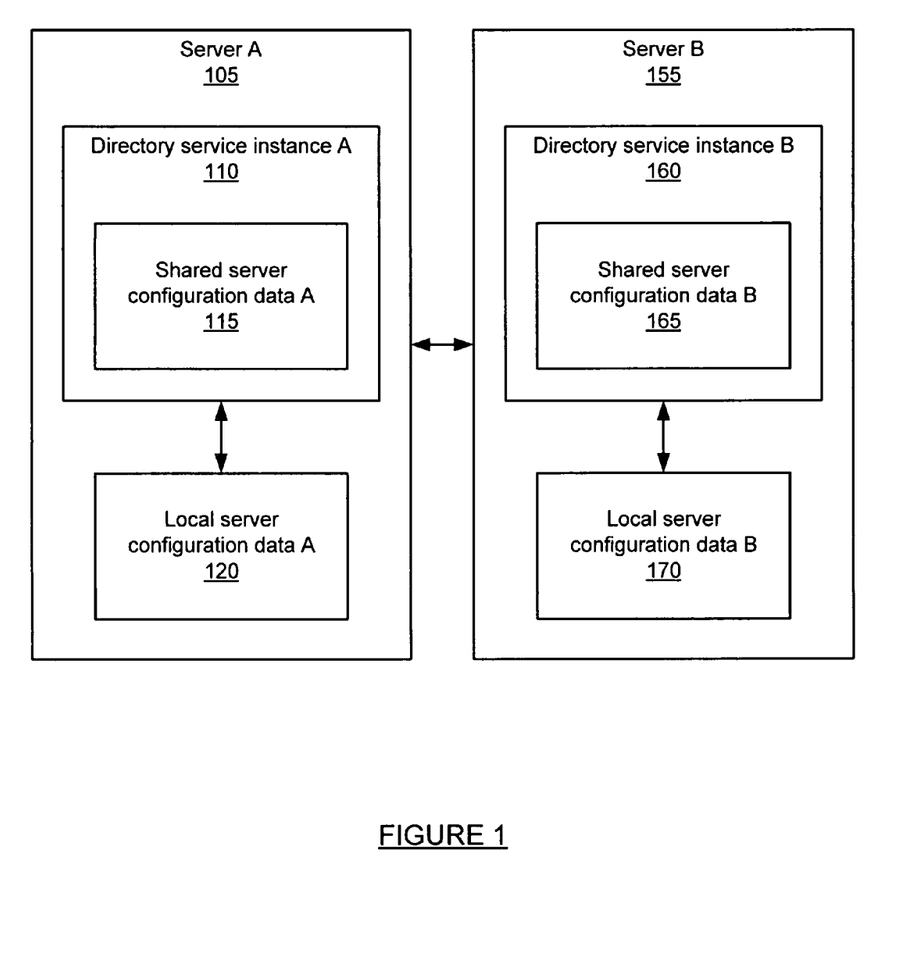
FIG. 1 shows a diagram of a system in accordance with one or more embodiments of the invention.

FIG. 1 shows a diagram of a system in accordance with one or more embodiments of the invention. Specifically, FIG. 1 shows a diagram of two servers (e.g., server A (105) and server B (155)) configured to communicate with each other. Server A (105) and server B (155) may communicate via a wired network connection (e.g., Ethernet, phone line, T-carrier, or any other similar type of connection), a wireless network connection (e.g., cellular transmissions, Bluetooth®, IEEE 802.11™, or any other similar type of connection), or any combination thereof. Bluetooth® is a registered trademark of the Bluetooth Special Interest Group (SIG). IEEE 802.11™ is a trademark of the Institute of Electrical and Electronics Engineers, Inc.

Further, server A (105) and server B (155) are configured to store server configuration data as local server configuration data A (120) and local server configuration data B (170). Specifically, local server configuration data A (120) and local server configuration data B (170) each include server configuration data associated with one or more software applications installed on server A (105) and/or server B (155). More specifically, the server configuration data may be represented as Lightweight Directory Access Protocol Data Interchange Format (LDIF), extensible markup language (XML), comma separate values (CSV), an initialization (INI) file, a dot file, a registry entry, a database entry, any other similar type of server configuration data, or any combination thereof. Further, the software application(s) may include an operating system, a file system, a web service, a software firewall, an antivirus service, an enterprise application, an email service, a directory service (e.g., directory service instance A (110) and/or directory service instance B (160)), a database, any other similar type of software application, or any combination thereof.

In one or more embodiments of the invention, local server configuration data A (120) and/or local server configuration data B (170) include the actual data used to configure the software application(s) on server A (105) and/or server B (155). That is, local server configuration data A (120) and/or local server configuration data B (170) may be stored in a format directly useable by the software application(s). More specifically, the software application(s) may use local server configuration data A (120) and/or local server configuration data B (170) for initialization and/or any other similar type of configuration.

Alternatively, local server configuration data A (120) and/or local server configuration data B (170) may simply be copies of the shared server configuration data that are not used directly by the software application(s). For example, local server configuration data A (120) and/or local server configuration data B (170) may include copies of a Lightweight Directory Access Protocol (LDAP) naming context. Shared server configuration data is discussed in detail below. In one or more embodiments of the invention, some combination of software application-specific formats and copies of shared server configuration data may be used. For example, a portion of local server configuration data A (120) and/or local server configuration data B (170) may be formatted for direct use by a software application, and another portion of local server configuration data A (120) and/or local server configuration data B (170) may simply be a copy of shared server configuration data.

More specifically, local server configuration data A (120) may include server configuration data only associated with software application(s) installed on server A (105), only associated with software application(s) installed on server B (155), or associated with software application(s) installed on server A (105) and on server B (155). Further, software application(s) installed on server A (105) and server B (155) may be the same software application(s), different software application(s), or any combination thereof.

Similarly, local server configuration data B (170) may include server configuration data only associated with software application(s) installed on server A (105), only associated with software application(s) installed on server B (155), or associated with software application(s) installed on server A (105) and on server B (155). Accordingly, local server configuration data A (120) and local server configuration data B (170) may be different (i.e., some or all of the server configuration data stored therein may differ) or may be identical.

Further, server A (105) and server B (155) are configured to operate directory service instances (i.e., directory service instance A (110) and directory service instance B (160)). In general, directory services are software applications configured to store, organize, and manage access to data on a network. Specifically, a directory service may store data in a database, an encrypted file, a proprietary file format, a standard exchange format such as LDIF, any other similar format, or any combination thereof. Further, directory service instances are separate installations of a directory service on separate servers, configured to synchronize the data with each other. The use of multiple directory service instances may provide for redundancy in the event that a directory service instance fails.

In one or more embodiments of the invention, directory service instance A (110) and directory service instance B (160) are configured to share server configuration data via shared server configuration data A (115) and shared server configuration data B (165). More specifically, shared server configuration data A (115) and shared server configuration data B (165) may be shareable versions of some or all of local server configuration data A (120) and/or local server configuration data B (170).

In one or more embodiments of the invention, directory service instance A (110) and directory service instance B (160) are further configured to share other types of data (e.g., employee information, workstation login credentials, organizational chart information, etc.). Said another way, sharing server configuration data may be only one designated purpose of directory service instance A (110) and directory service instance B (160). Alternatively, directory service instance A (110) and directory service instance B (160) may be installed on server A (105) and server B (155) specifically to enable sharing of server configuration data. In such cases, server A (105) and server B (155) may be considered servers simply by virtue of their role in sharing the server configuration data.

In one or more embodiments of the invention, directory service instance A (110) and directory service instance B (160) are LDAP service instances. Accordingly, shared server configuration data A (115) and shared server configuration data B (165) may include one or more LDAP naming contexts, i.e., high-level distinguished names in an LDAP directory hierarchy. Further, shared server configuration data A (115) and shared server configuration data B (165) may include one or more LDAP entries depending from the LDAP naming context(s). While the present description refers specifically to the use of LDAP service instances, those skilled in the art will appreciate that any other similar type of directory service instance may be used.

The following is an example of how an LDAP naming context may be used to store server configuration data. First, an LDAP naming context is created as follows:

dn: cn=config

Next, an LDAP entry is created within the naming context:

dn: cn=local, cn=config
    ldap-port: 389
    ldaps-port: 636

In this example, server configuration data (in this case, LDAP port settings) are stored as attributes of the LDAP entry. To store further configuration data, additional attributes may be created in the same LDAP entry, or a new LDAP entry may be created. For example, a separate LDAP entry may be created to store an administrative password, as follows:

dn: cn=admin, ou=Administrators, cn=config
    userPassword: secret In one or more embodiments of the invention, different LDAP entries are used for different applications and/or to distinguish local server configuration data from remote server configuration data. Those skilled in the art will appreciate that the preceding examples are provided for exemplary purposes only and should not be construed as limiting the scope of the invention.

In one or more embodiments of the invention, the use of directory service instances to share server configuration data provides a convenient sharing mechanism that ensures proper replication of the server configuration data across servers. Further, by using the shared server configuration data to update local server configuration data, and vice versa, software applications may be able to take advantage of the sharing mechanism without requiring any redevelopment or significant modifications.

While FIG. 1 has been discussed with respect to only two servers, those skilled in the art will appreciate that embodiments of the invention may be extended to include more than two servers. Specifically, directory service instances may be installed on any number of servers and configured to share server configuration data.

Figure 2:
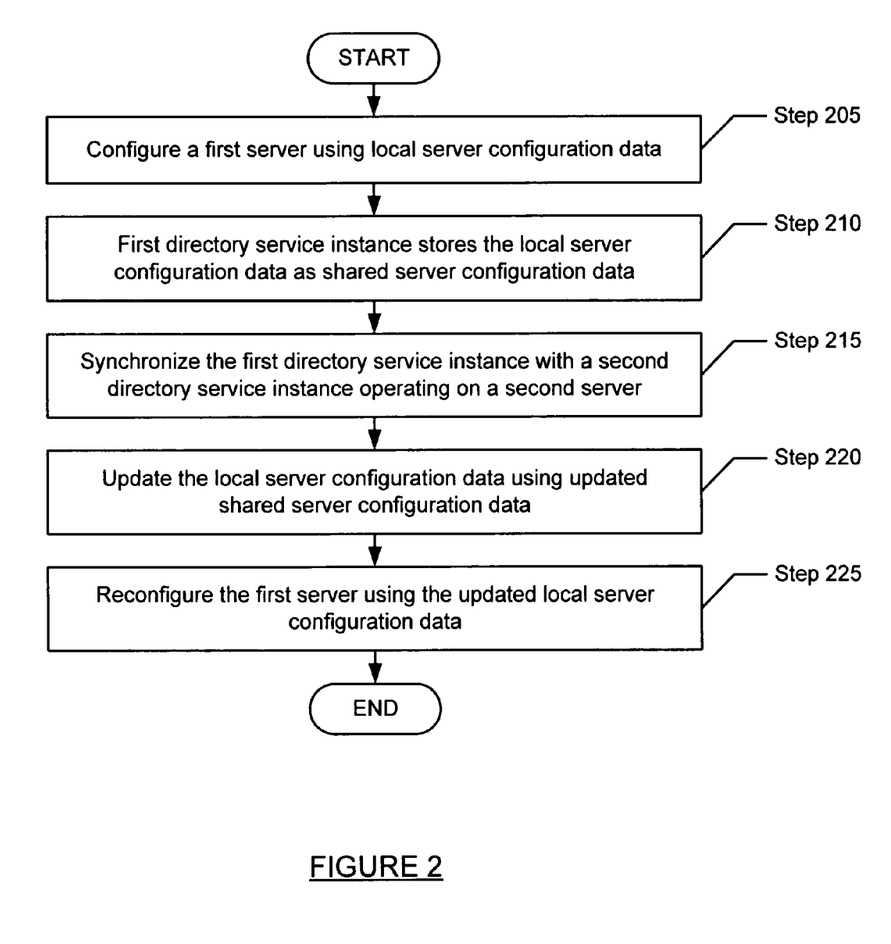
FIGS. 2-3 show flowcharts in accordance with one or more embodiments of the invention.

FIG. 2 shows a flowchart in accordance with one or more embodiments of the invention. Specifically, FIG. 2 shows a flowchart of a method for managing server configuration data in accordance with one or more embodiments of the invention. In one or more embodiments of the invention, one or more of the steps shown in FIG. 2 are omitted, repeated, and/or performed in a different order. Accordingly, the specific arrangement of steps shown in FIG. 2 should not be construed as limiting the scope of the invention.

Further, those skilled in the art will appreciate that the terms "first" and "second" are used in the following discussion of FIG. 2 solely to differentiate elements having similar nomenclature. Accordingly, the terms "first" and "second" as used herein should not be construed as implying any specific ordering of elements.

In one or more embodiments of the invention, in Step 205, a first server is configured using local server configuration data. Specifically, some or all of the local server configuration data is used to initialize and/or otherwise configure one or more software applications installed on the first server. As discussed above with respect to FIG. 1, the local server configuration data may also include server configuration data associated with one or more software applications installed on other servers. For example, the local server configuration data may include server configuration data associated with a software application installed on the second server discussed below with respect to Step 215.

In one or more embodiments of the invention, in Step 210, the local server configuration data is stored as shared server configuration data by a first directory service instance operating on the first server. Specifically, for the first directory service instance to store the shared server configuration data, the local server configuration data may be translated into a format compatible with the first directory service instance. For example, if the first directory service instance is an LDAP service instance, the local server configuration data may be translated into a format for populating one or more LDAP naming contexts and/or other LDAP entries.

Further, storing the shared server configuration data may be initiated by the first directory service instance, by a software application with which the server configuration data is associated, or by another software application specifically configured to act as a bridge between the local server configuration data and the first directory service instance.

Specifically, in one or more embodiments of the invention, storing the shared server configuration data is initiated by an administrative software application operatively connected to the first directory service instance. The administrative software application may send a request to the first directory service instance to modify server configuration data. The request may be authenticated by the first directory service instance (e.g., to determine whether the administrative software application is authorized to make the request). If the request is valid, then the first directory service instance stores the server configuration data. If the request is not valid, then the administrative software application rejects the request.

In one or more embodiments of the invention, in Step 215, the first directory service instance is synchronized with a second directory service instance operating on a second server. If the first directory service instance and the second directory service instance are both LDAP service instances, the synchronization may simply involve LDAP data replication. Said another way, synchronization of the shared server configuration data may be achieved by taking advantage of existing data replication functionality offered by the LDAP protocol. Although there is currently no universally adopted standard for LDAP data replication, the mechanisms for LDAP data replication are well understood in the art. Further, use of the LDAP protocol may require a software extension to the LDAP protocol to allow interaction between an administrative software application and an LDAP service instance.

Once the first directory service instance and the second directory service instance are synchronized, both directory service instances effectively contain synchronized shared server configuration data. That is, shared server configuration data stored by one or more of the directory service instances may be updated to reflect changes in the other directory service instance.

In one or more embodiments of the invention, in Step 220, the local server configuration data on the first server is updated using updated shared server configuration data (i.e., shared server configuration data updated via synchronization in Step 215). Specifically, the updated shared server configuration data may be translated into a format required by the local server configuration data (e.g., LDIF, XML, CSV, etc. as discussed above with respect to FIG. 1). The translated server configuration data may then be copied into the local server configuration data.

In one or more embodiments of the invention, the translated server configuration data replaces whatever server configuration data was previously stored in the local server configuration data. Specifically, updating the local server configuration data may involve replacing all of the local server configuration data, or may simply involve replacing a portion of the local server configuration data that differs from the most recent value(s) in the updated shared server configuration data. In one or more embodiments of the invention, timestamps are maintained for each portion of the shared server configuration data and used to determine which portion(s) have been modified.

In one or more embodiments of the invention, in Step 225, the first server is reconfigured using the updated local server configuration data. Specifically, one or more software applications installed on the first server may be re-initialized or otherwise reconfigured based on an update to the local server configuration data performed in Step 220. Alternatively, if the update(s) to the local server configuration data are associated with software application(s) not installed on the first server, no reconfiguration of the first server is required. Further, in one or more embodiments of the invention, the first server may be automatically restarted for the modifications to take effect. Those skilled in the art will appreciate that whether or not the first server is restarted typically depends on the type of server configuration data that is updated. For example, some operating systems include server configuration data that requires restarting the server for any changes to take effect after the data is updated; other server configuration data changes may take effect without requiring the server to be restarted.

Figure 3:
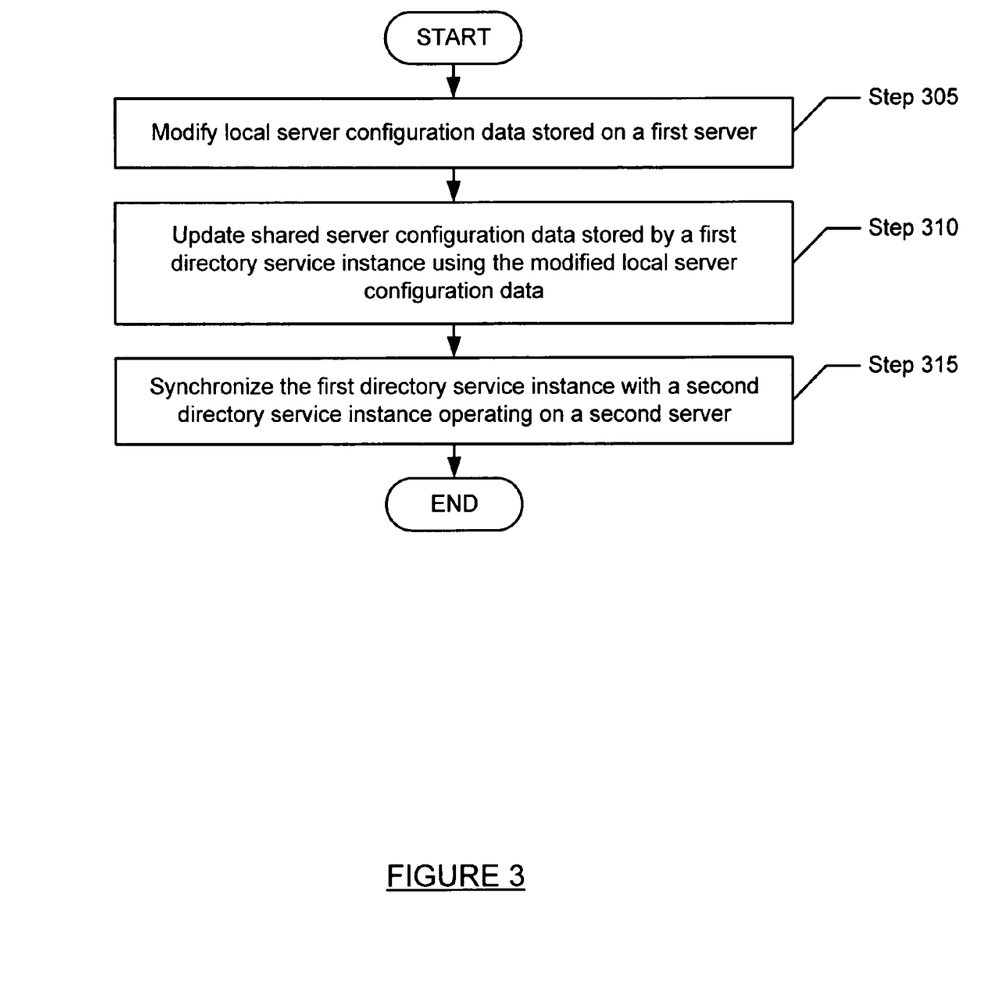

FIG. 3 shows a flowchart in accordance with one or more embodiments of the invention. Specifically, FIG. 3 shows a flowchart of a method for managing server configuration data in accordance with one or more embodiments of the invention. In one or more embodiments of the invention, one or more of the steps shown in FIG. 3 are omitted, repeated, and/or performed in a different order. Accordingly, the specific arrangement of steps shown in FIG. 3 should not be construed as limiting the scope of the invention.

Further, those skilled in the art will appreciate that the terms "first" and "second" are used in the following discussion of FIG. 3 solely to differentiate elements having similar nomenclature. Accordingly, the terms "first" and "second" as used herein should not be construed as implying any specific ordering of elements.

In one or more embodiments of the invention, in Step 305, local server configuration data stored on a first server is modified. Specifically, the server configuration data that is modified may be associated with a software application installed on the first server and/or may be associated with a software application installed on another server. For example, the server configuration data may be associated with the second server discussed below with respect to Step 315.

In one or more embodiments of the invention, in Step 310, shared server configuration data stored by a first directory service instance is updated. Specifically, the shared server configuration data is updated using the modified local server configuration data. In one or more embodiments of the invention, to store the shared server configuration data in the first directory service instance, the local server configuration data is translated into a format compatible with the first directory service instance. For example, if the first directory service instance is an LDAP service instance, the local server configuration data may be translated into a format for populating one or more LDAP naming contexts and/or other LDAP entries. Further, updating the shared server configuration data may be initiated by the first directory service instance, by a software application with which the server configuration data is associated, or by another software application specifically configured to act as a bridge between the local server configuration data and the first directory service instance.

In one or more embodiments of the invention, updating the shared server configuration data is initiated by a user of an administrative software application. Specifically, the user may issue a request to update the shared server configuration data via the administrative software application. For example, the user may use the administrative software application to move a service to a read-only state during backup, which may require updating server configuration data. As another example, the user may issue a request, via the administrative software application, to add a search index to a shared LDAP database. Those skilled in the art will appreciate that the administrative software application may take many forms, and may allow for many different types of update requests.

In one or more embodiments of the invention, in Step 315, the first directory service instance is synchronized with a second directory service instance operating on a second server. If the first directory service instance and the second directory service instance are both LDAP service instances, the synchronization may simply involve LDAP data replication. Said another way, synchronization of the shared server configuration data may be achieved by taking advantage of existing data replication functionality offered by the LDAP protocol. Once the first directory service instance and the second directory service instance are synchronized, both directory service instances effectively contain synchronized shared server configuration data. That is, shared server configuration data stored by one or more of the directory service instances may be updated to reflect changes in the other directory service instance.

FIGS. 4A-4F show diagrams of an example of managing server configuration data in accordance with one or more embodiments of the invention. Those skilled in the art will appreciate that FIGS. 4A-4F are provided for exemplary purposes only, and accordingly should not be construed as limiting the scope of the invention.

The example shown in FIGS. 4A-4F involves two servers (i.e., server P (405) and server Q (420)). Server P (405) and server Q (420) are each configured to operate directory service instances (i.e., directory service instance P (410) and directory service instance Q (420)). Further, server P (405) and server Q (420) are each configured to store local server configuration data (i.e., local server configuration data P (415), and local server configuration data Q (430)).

Figure 4A:
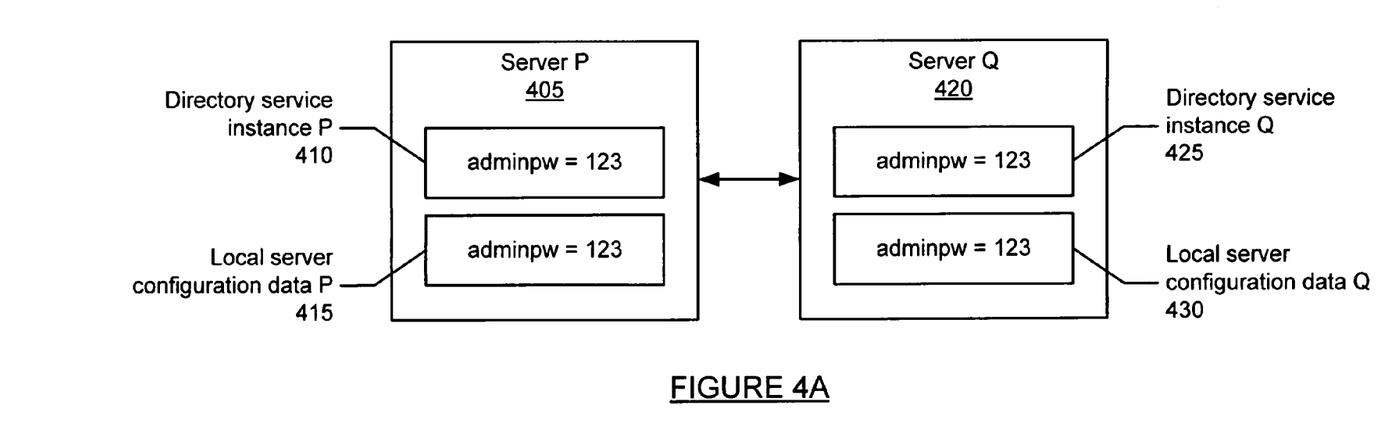
FIGS. 4A-4F show diagrams of an example of managing server configuration data in accordance with one or more embodiments of the invention.

Initially, in FIG. 4A, directory service instance P (410), local server configuration data P (415), directory service instance Q (425), and local server configuration data Q (430) all contain the same server configuration data. Specifically, the value of the configuration string "adminpw" is "123" in all four locations. In this example, Server P (405) and Server Q (420) are both configured to use the "adminpw" configuration string. Alternatively, as discussed above, server configuration data could be local to one server, and another server could simply store a replica of the server configuration data, i.e., as a remote copy.

Figure 4B:
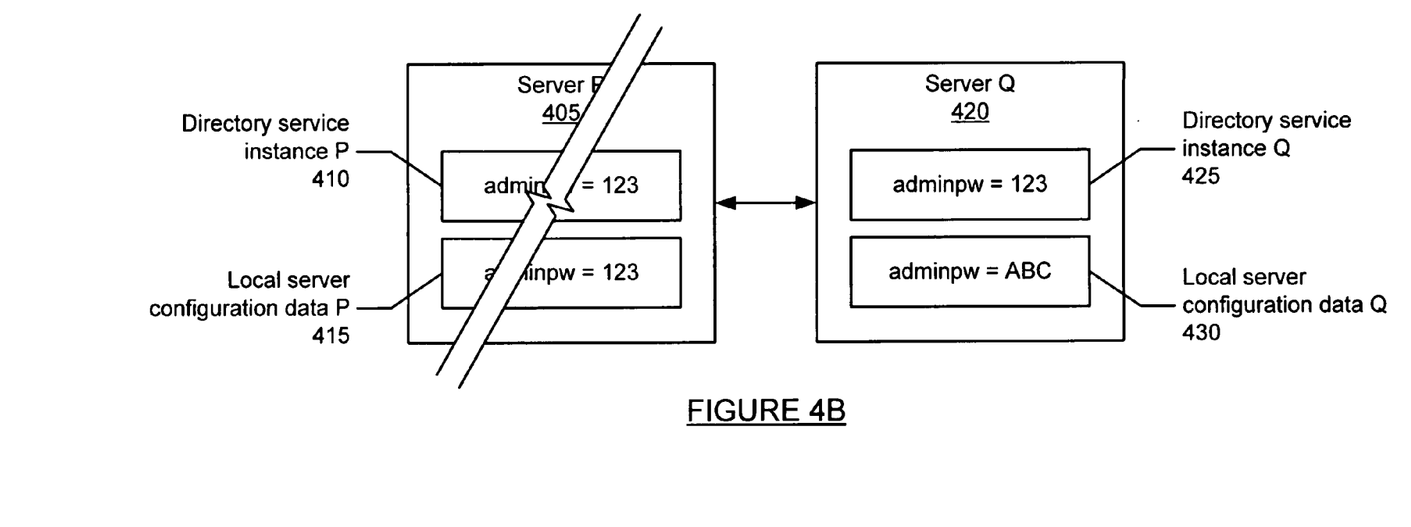

In FIG. 4B, server P (405) is unavailable. For example, an operating system on server P (405) may have crashed, a network connection to server P (405) may have been severed, etc. Accordingly, in FIG. 4B, it is not possible to directly update local server configuration data P (415). Further, in FIG. 4B, local server configuration data Q (430) is modified so that the value of the configuration string "adminpw" is now "ABC."

Figure 4C:
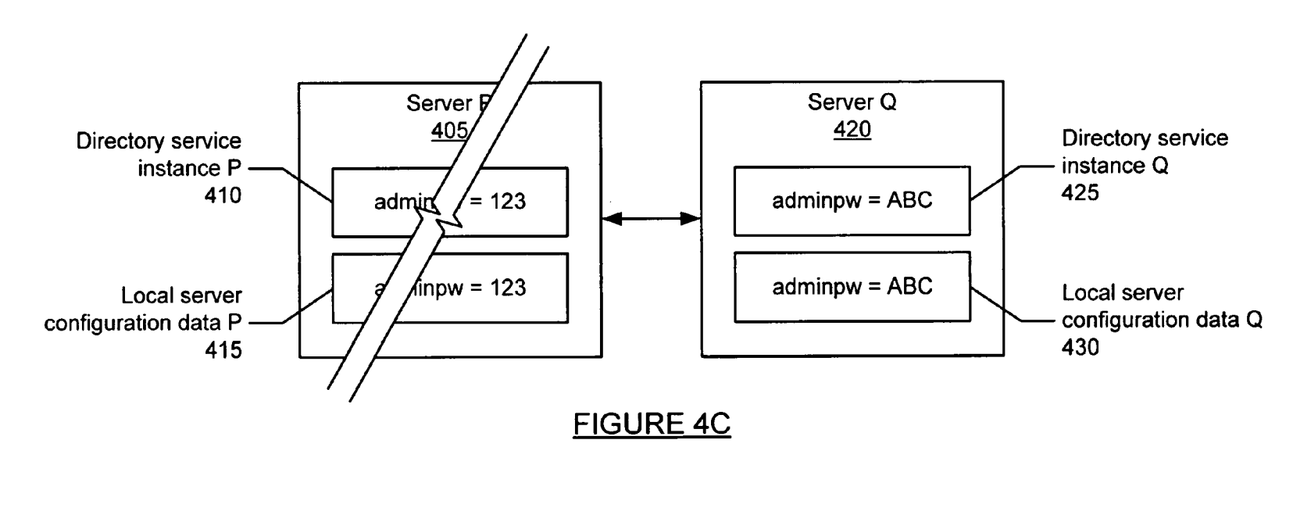

In FIG. 4C, server P (405) remains unavailable. Further, because local server configuration data Q (430) has been modified, directory service instance Q (425) is updated to reflect the new value of the configuration string "adminpw."

Figure 4D:
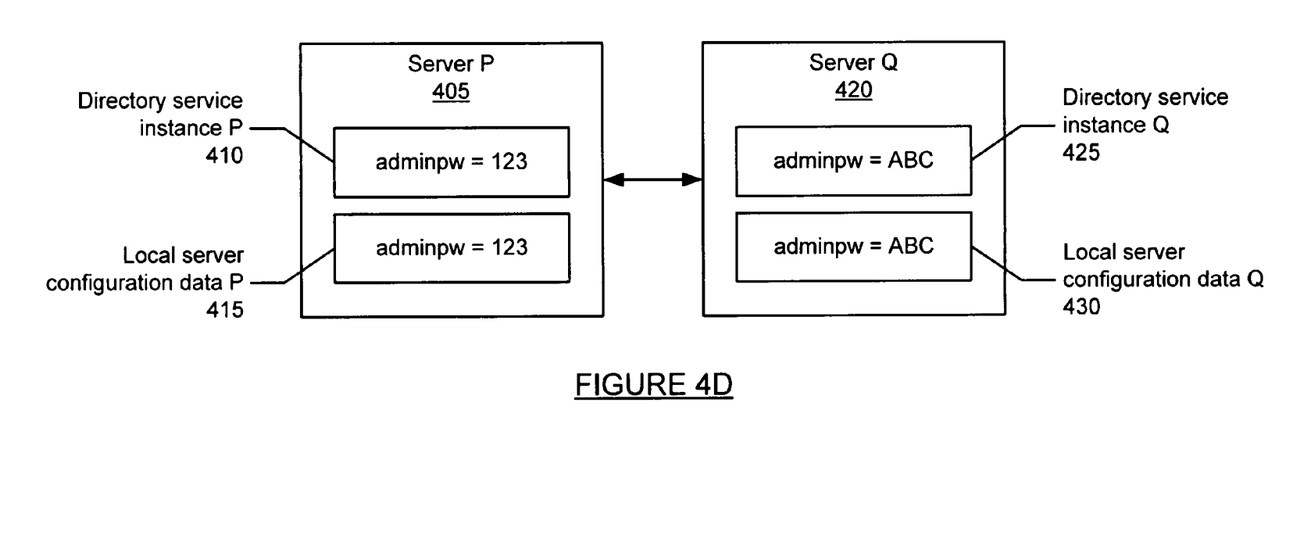

In FIG. 4D, access to server P (405) is restored. However, server P (405) still retains the old value of the configuration string "adminpw" in directory service instance P (410) and in local server configuration data P (415). Said another way, the server configuration data stored on server P (405) is effectively out-of-date.

Figure 4E:
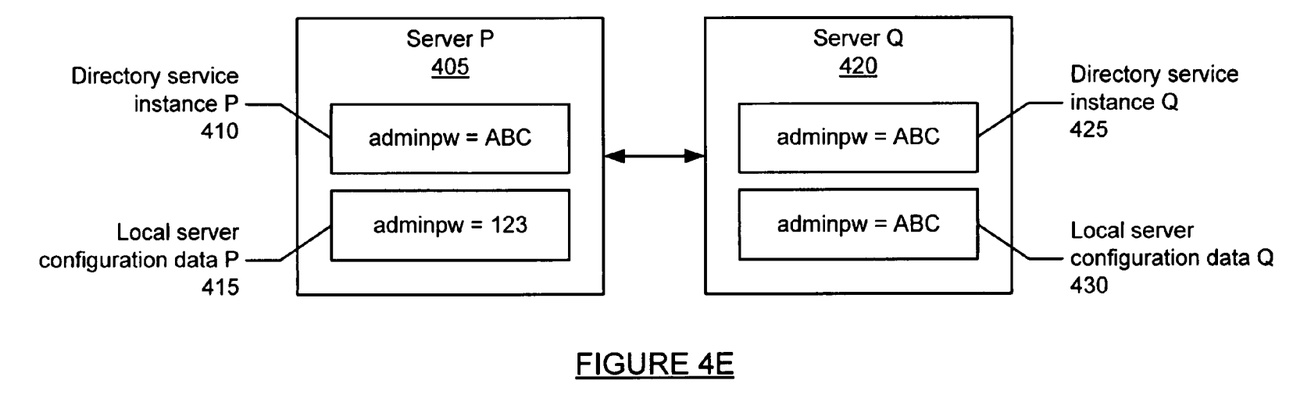
Figure 4F:
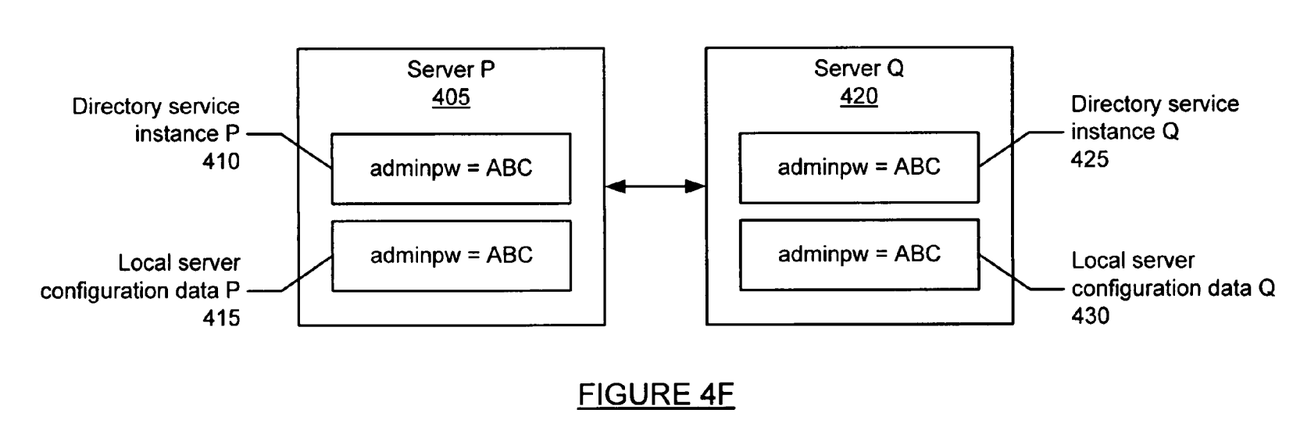

In FIG. 4E, directory service instance P (410) and directory service instance Q (425) are synchronized. Specifically, the updated value of the configuration string "adminpw" is transmitted from directory service instance Q (425) to directory service instance P (410). In FIG. 4F, because directory service instance P (410) has been modified, local server configuration data P (415) is updated to reflect the new value of the configuration string "adminpw." At this point, the server configuration data stored on server P (405) and server Q (420) is fully synchronized and up-to-date.

As discussed above, in one or more embodiments of the invention, the use of directory service instances to share server configuration data provides a convenient sharing mechanism that ensures proper replication of the server configuration data across servers. Further, by using the shared server configuration data to update local server configuration data, and vice versa, software applications may be able to take advantage of the sharing mechanism without requiring any redevelopment or significant modifications.

Moreover, one or more embodiments of the invention reduce or eliminate the need for administrators to perform manual updates of server configuration data on multiple servers. Further, the use of multiple directory service instances to share server configuration data may ensure that no single server acts as a central point of failure. Specifically, embodiments of the invention ensure that server configuration data is updated correctly even if one or more servers are temporarily unavailable.

Figure 5:
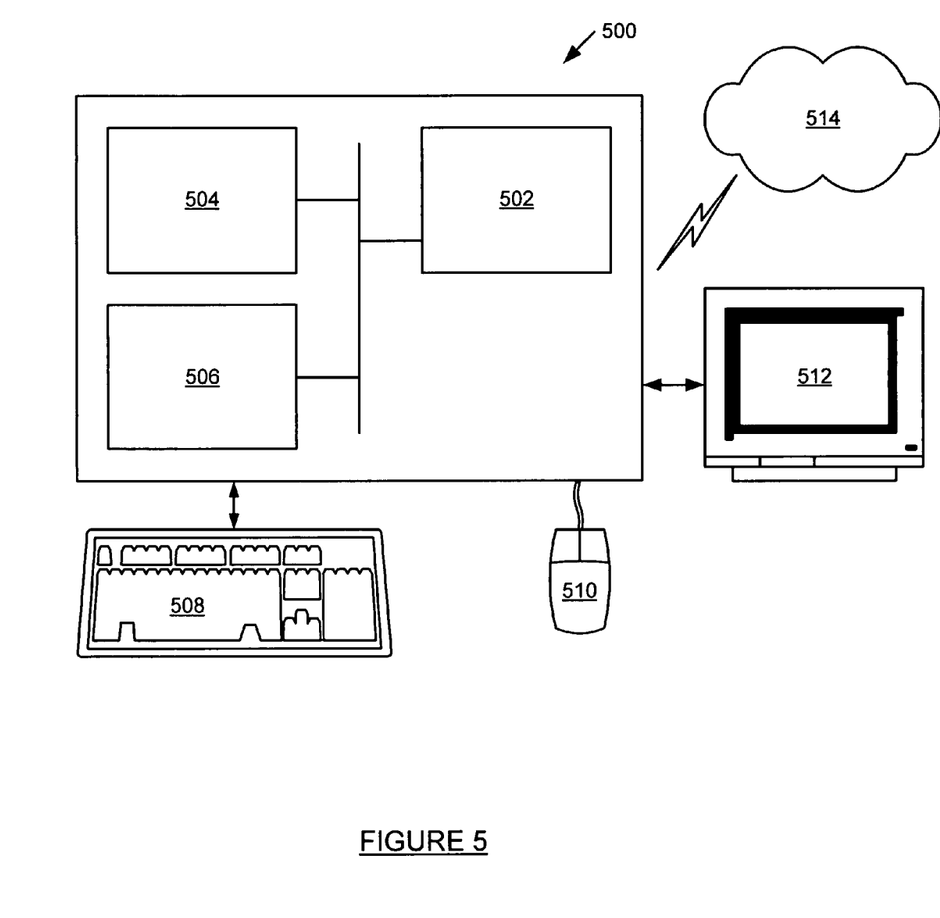
FIG. 5 shows a diagram of a computer system in accordance with one or more embodiments of the invention.

Embodiments of the invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) may be connected to a network (514) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., server, directory service instance, shared server configuration data, local server configuration data, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium storing executable instructions for managing server configuration data by:
    obtaining first local server configuration data, wherein the first local server configuration data specifies a configuration of a first server and is stored on the first server, wherein the first local server configuration data includes a first value of a configuration attribute, and wherein the first local server configuration data comprises configuration data for configuring at least one software application installed on the first server;
    obtaining first shared server configuration data using the first local server configuration data, wherein the first shared server configuration data is shared by a first directory service instance operating on the first server, and wherein the first shared server configuration data includes the first value of the configuration attribute;
    synchronizing the first directory service instance with a second directory service instance to obtain second shared server configuration data, wherein the second shared server configuration data is shared by the second directory service instance, wherein the second directory service instance operates on a second server, and wherein the second shared server configuration data includes the first value of the configuration attribute;
    obtaining second local server configuration data using the second shared server configuration data, wherein the second local configuration data is stored in the second server, and wherein the second local configuration data includes the first value of the configuration attribute;
    configuring the second server using the first value of the configuration attribute included in second local configuration data;
    after configuring the second server, modifying the second local server configuration data to obtain modified second local server configuration data, wherein the modified second local server configuration data includes a second value of the configuration attribute;
    modifying the second shared server configuration data using the modified second local server configuration data to obtain modified second shared server configuration data, wherein the modified second shared server configuration data includes the second value of the configuration attribute; and
    modifying the first shared server configuration data to obtain modified first shared server configuration data, wherein modifying the first shared server configuration data comprises synchronizing the first directory service instance with the second directory service instance, and wherein the modified first shared server configuration data includes the second value of the configuration attribute.

2. The non-transitory computer readable medium of claim 1, further comprising executable instructions for managing the server configuration data by: configuring the first server using the first local server configuration data.

3. The non-transitory computer readable medium of claim 1, further comprising executable instructions for managing the server configuration data by:
    modifying the first local server configuration data using the modified first shared server configuration data to obtain modified first local server configuration data, wherein the modified first local server configuration data comprises the second value of the configuration attribute; and
    configuring the first server using the second value of the configuration attribute.

4. The non-transitory computer readable medium of claim 1, wherein the first directory service instance and the second directory service instance comprise Lightweight Directory Access Protocol (LDAP) service instances.

5. The non-transitory computer readable medium of claim 4, wherein the first shared server configuration data comprises an LDAP naming context.

6. The non-transitory computer readable medium of claim 1, wherein the first local server configuration data comprises configuration data for configuring the first directory service instance.

7. A non-transitory computer readable medium storing executable instructions for managing server configuration data by:
    obtaining first local server configuration data, wherein the first local server configuration data specifies a configuration of a first server and is stored on the first server, and wherein the first local server configuration data comprises configuration data for configuring at least one software application installed on the first server;
    obtaining first shared server configuration data using the first local server configuration data, wherein the first shared server configuration data is stored by a first directory service instance operating on the first server;
    synchronizing the first directory service instance with a second directory service instance to obtain second shared server configuration data, wherein the second directory service instance operates on a second server, and wherein the second shared server configuration data is shared by the second directory service;

obtaining second local server configuration data using the second shared server configuration data, wherein the second local configuration data is stored in the second server;

configuring the second server using the second local server configuration data;

after configuring the second server, modifying the second local server configuration data to obtain modified second local server configuration data;

modifying the second shared server configuration data using the modified second local server configuration data to obtain modified second shared server configuration data; and modifying the first shared server configuration data to obtain modified first shared server configuration data, wherein modifying the first shared server configuration data comprises synchronizing the first directory service instance with the second directory service instance.

8. The non-transitory computer readable medium of claim 7, wherein the first server is configured using the first local server configuration data.

9. The non-transitory computer readable medium of claim 7, wherein the second server is reconfigured using the modified second local server configuration data.

10. The non-transitory computer readable medium of claim 7, wherein the first directory service instance and the second directory service instance comprise Lightweight Directory Access Protocol (LDAP) service instances.

11. The non-transitory computer readable medium of claim 10, wherein the first shared server configuration data comprises an LDAP naming context.

12. The non-transitory computer readable medium of claim 7, wherein the first local server configuration data comprises configuration data for configuring the first directory service instance.

13. A system comprising:
a first server comprising:
a first processor,
first local server configuration data specifying a configuration of the first server, and
a first directory service instance storing first shared server configuration data, wherein the first shared server configuration data is updated using the first local server configuration data when the first local server configuration data is modified, wherein the first local server configuration data is updated using the first shared server configuration data when the first shared server configuration data is synchronized with second shared server configuration data, and wherein the first local server configuration data comprises configuration data for configuring at least one software application installed on the first server; and a second server comprising:
a second processor,
second local server configuration data specifying a configuration of the second server, and
a second directory service instance storing the second shared configuration data, wherein the second shared server configuration data is updated using the second local server configuration data when the second local server configuration data is modified, wherein the second local server configuration data is updated using the second shared server configuration data when the second shared server configuration data is synchronized with the first shared server configuration data, and wherein the first directory service instance and the second directory service instance are configured to synchronize the first shared configuration data and the second shared configuration data.

14. The system of claim 13, wherein the first server is configured using the first local server configuration data.

15. The system of claim 13, wherein the second server is configured using the second local server configuration data.

16. The system of claim 13, wherein the first directory service instance and the second directory service instance comprise Lightweight Directory Access Protocol (LDAP) service instances.

17. The system of claim 16, wherein the first shared server configuration data comprises an LDAP naming context.

18. The system of claim 13, wherein the first local server configuration data comprises configuration data for configuring the first directory service instance.

* * * * *